April 4, 1967 W. F. EISEMAN ET AL 3,312,958

MAGNETIC CORE MATRIX ASSEMBLY

Filed Jan. 4, 1963

6 Sheets-Sheet 1

PRIOR ART

| COMBINATION | WORD | COMBINATION | WORD | COMBINATION | WORD | COMBINATION | WORD |
|---|---|---|---|---|---|---|---|
| $X_1 Y_1$ | 1 | $X_3 Y_1$ | 11 | $X_5 Y_1$ | 17 | $X_7 Y_1$ | 27 |
| $X_1 Y_2$ | 2 | $X_3 Y_2$ | 12 | $X_5 Y_2$ | 18 | $X_7 Y_2$ | 28 |
| $X_1 Y_3$ | 6 | $X_3 Y_3$ | 16 | $X_5 Y_3$ | 22 | $X_7 Y_3$ | 32 |
| $X_1 Y_4$ | 5 | $X_3 Y_4$ | 15 | $X_5 Y_4$ | 21 | $X_7 Y_4$ | 31 |
| | | | | | | | |
| $X_2 Y_1$ | 3 | $X_4 Y_1$ | 9 | $X_6 Y_1$ | 19 | $X_8 Y_1$ | 25 |
| $X_2 Y_2$ | 4 | $X_4 Y_2$ | 10 | $X_6 Y_2$ | 20 | $X_8 Y_2$ | 26 |
| $X_2 Y_3$ | 8 | $X_4 Y_3$ | 14 | $X_6 Y_3$ | 24 | $X_8 Y_3$ | 30 |
| $X_2 Y_4$ | 7 | $X_4 Y_4$ | 13 | $X_6 Y_4$ | 23 | $X_8 Y_4$ | 29 |

WITNESSES
Edwin E. Baer
James F. Young

INVENTORS
William F. Eiseman &
John C. Donohue
BY Ernest P. Klipfel
ATTORNEY

MAGNETIC CORE MATRIX ASSEMBLY

Filed Jan. 4, 1963

6 Sheets-Sheet 3

MAGNETIC CORE MATRIX ASSEMBLY

Filed Jan. 4, 1963

April 4, 1967 W. F. EISEMAN ET AL 3,312,958

MAGNETIC CORE MATRIX ASSEMBLY

Filed Jan. 4, 1963 6 Sheets-Sheet 6

United States Patent Office 3,312,958

Patented Apr. 4, 1967

3,312,958

MAGNETIC CORE MATRIX ASSEMBLY

William F. Eiseman, North Linthicum, and John C. Donohue, Hanover, Md., assignors to Westinghouse Electric Corporation, Pittsburgh, Pa., a corporation of Pennsylvania Filed Jan. 4, 1963, Ser. No. 249,513
13 Claims. (Cl. 340—174)

The present invention relates generally to magnetic core arrays and more particularly to a magnetic core array requiring only two-dimensional internal wiring.

The wiring of multi-aperture cores into memory planes, and the planes into a stack, has in prior art devices involved three-dimensional internal wiring for the interconnection of the cores.

For example, the memory array of the prior art is usually arranged so that one bit of each word is located in each plane. Such an arrangement can be made to be linear read (interrogate)-word organized, and coincident write-bit organized, but the disposition of one bit of each word in each plane of the memory stack results in almost a solidified block when the windings are added to the array.

To overcome the aforementioned disadvantages, a magnetic array and wiring organization of the present invention, although still linear read-word organized, and coincident write-bit organized, allows internal wiring of the stack in two dimensions only, and all the interconnections of the planes are made externally. The total array is divided into planes with complete words located on each plane. In such a manner, word-capacity can be increased by adding additional pairs of planes in a frame to the stack. At the same time the stack can be easily disassembled for repair and readily assembled during manufacture.

An object of the present invention is to provide a magnetic core array wherein all internal wiring of the stack is only two-dimensional.

Another object of the present invention is to provide the memory array made up of separately wired planes each connected to other planes externally of the frame enclosing the planes.

Further objects and advantages of the present invention will be readily apparent from the following detailed description taken in conjunction with the drawing, in which.

Figure 1:
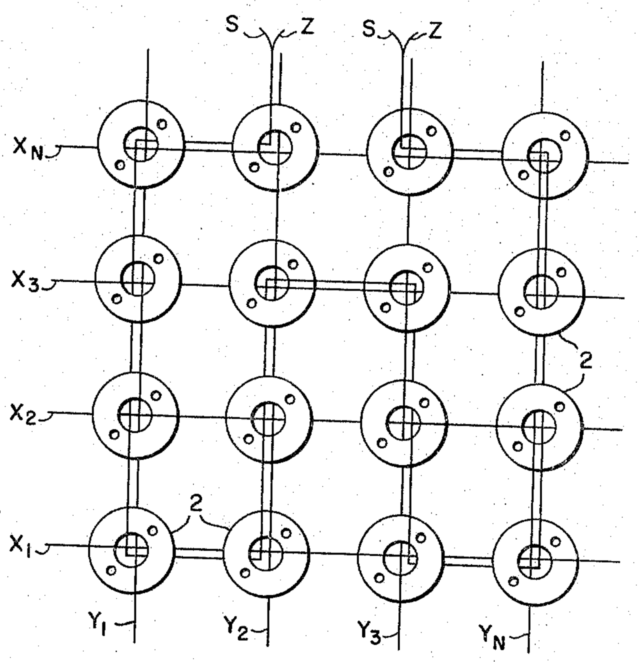
FIGS. 1 and 2 are schematic diagrams of a memory array of the prior art.
Figure 2:
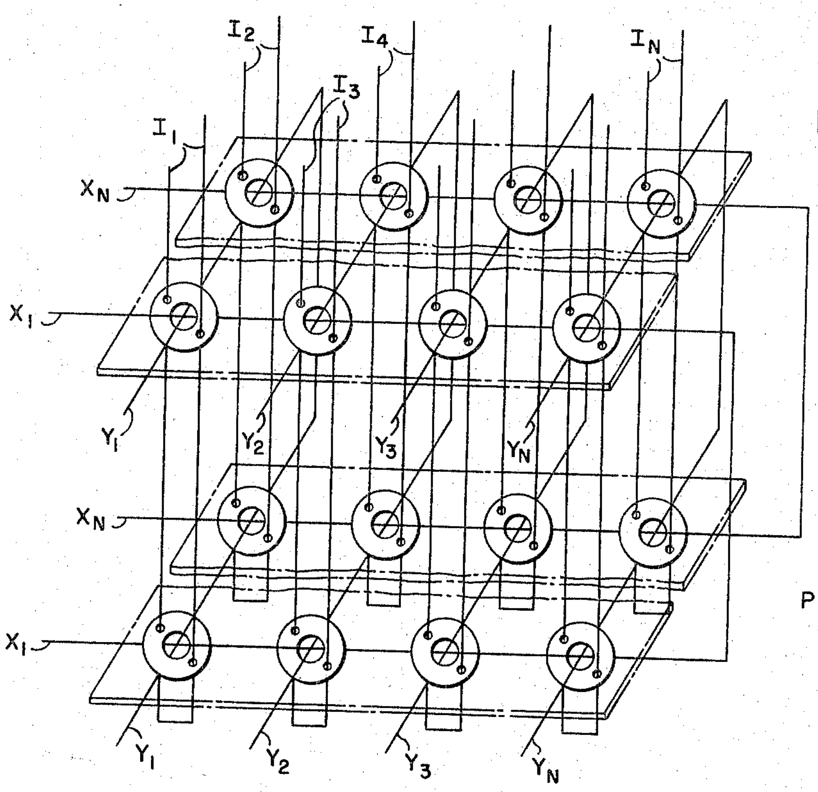
Fig. 2. PRIOR ART

A typical example of prior art memory arrays is illustrated in FIGS. 1 and 2 where a small matrix of only a few cores is shown to simplify the illustration. The memory array can be classified as a linear read-word organized, and coincident write-bit organized. The stack is arranged so that one bit storage element of each word is located in each plane of the array.

In FIG. 1, a plurality of bit storage elements or multi-aperture cores 2 are illustrated disposed in a single plane with first half-select write or X-windings and a second half-select write or Y-windings extending at right angles to each other through the major aperture of each core 2. A pair of windings comprising a sense S and an inhibit or Z-winding are threaded through all the cores 2 on each plane. It is to be noted that the interrogate windings which extend through the minor apertures of each core 2 have been omitted for purposes of clarity. When these windings are added, however, as shown in FIG. 2, the memory array becomes almost a solidified block.

FIG. 2 illustrates two parallel planes of multi-aperture cores 2 which are normally adjacent to each other but are shown apart for illustration purposes. For further clarification, the paired sense and inhibit windings have been omitted. Again, the X-windings $X_1 \ldots X_n$ and the Y-windings $Y_1, Y_2 \ldots Y_n$ extend through the major aperture of each core 2 at right angles to each other. The interrogate windings $I_1, I_2 \ldots I_n$ each extend vertically through the minor apertures of one core in each plane and hence through a word running as a column through the planes of multi-aperture cores.

Figures 3, 6:
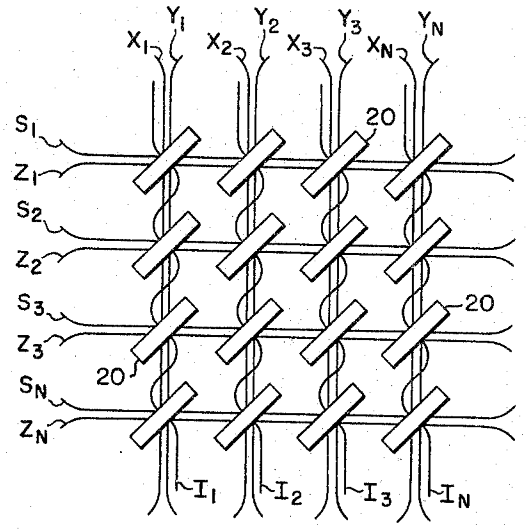
FIG. 3 is a fragmentary schematic diagram of a memory array in accordance with the present invention.
FIG. 6 is a table presented for a better understanding of the wire organization shown in FIGS. 4 and 5.

It is readily apparent that such an organization of the memory array is extremely difficult to assemble since the planes of cores are completely interconnected by both internal and external leads. Only one man can work on the stack at one time and his task becomes a long and tedious affair. The testing of a memory stack is a difficult proposition since individual cores, especially multi-aperture cores, that test perfectly well as unassembled components will show up as defective after they are wired into the stack. In the stack of the prior art, the stack cannot be fully tested as a functional unit until it has been solidified into a three-dimensional block by the addition of the interrogate lines. If one or more cores are then found defective, the entire stack must be disassembled to get them to replace. Once assembled, all of the interrogate windings I must first be removed at a tremendous cost in time and money before the array can be disassembled for repair. The array is fixed and inflexible since the word-capacity of a given stack cannot be increased. The organization of the array shown in FIGS. 1 and 2 does not readily allow orientation of the cores on end for angular disposition to obtain straight wiring runs. Truly, the magnetic array of the prior art has become very impractical for large scale memory units. In order to overcome the above-mentioned, and very serious, disadvantages, a core array and wiring organization was developed that, although still linear read-word organized and coincident write-bit organized, has complete words located on each plane. The total memory array is divided into a stack of frames, each frame having two parallel planes, each divided into two groups of magnetic cores. One such group is as illustrated in FIG. 3.

A plurality of cores 20 is disposed on end and at substantially 45° to the windings threaded through the major aperture of each core. The direction of the windings through the cores has not been indicated. However, the X-windings and Y-windings, or first and second half-select write windings are shown extending through the major aperture of each core 20 at substantially 90° angles to the sense winding S and inhibit winding Z. The interrogate windings I pass through the minor apertures (not shown) of each core. It should be noted that all the internal wiring of the group is two-dimensional and that all interconnections of the planes can be made externally.

Figure 4:
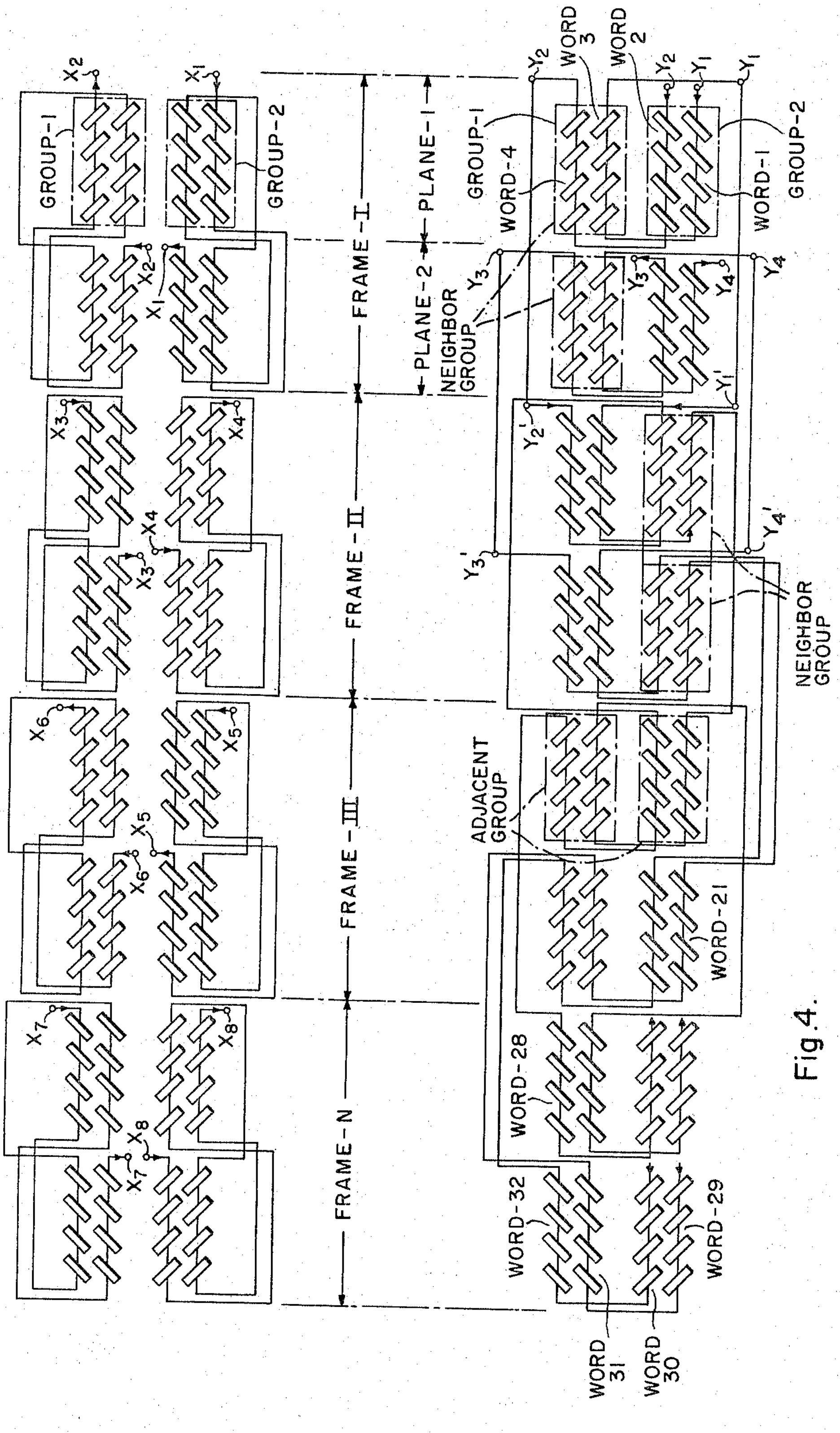
FIGS. 4 and 5 are schematic diagrams of an illustrative embodiment of the present invention showing the disposition of the cores and the wiring organization.
Figure 5:
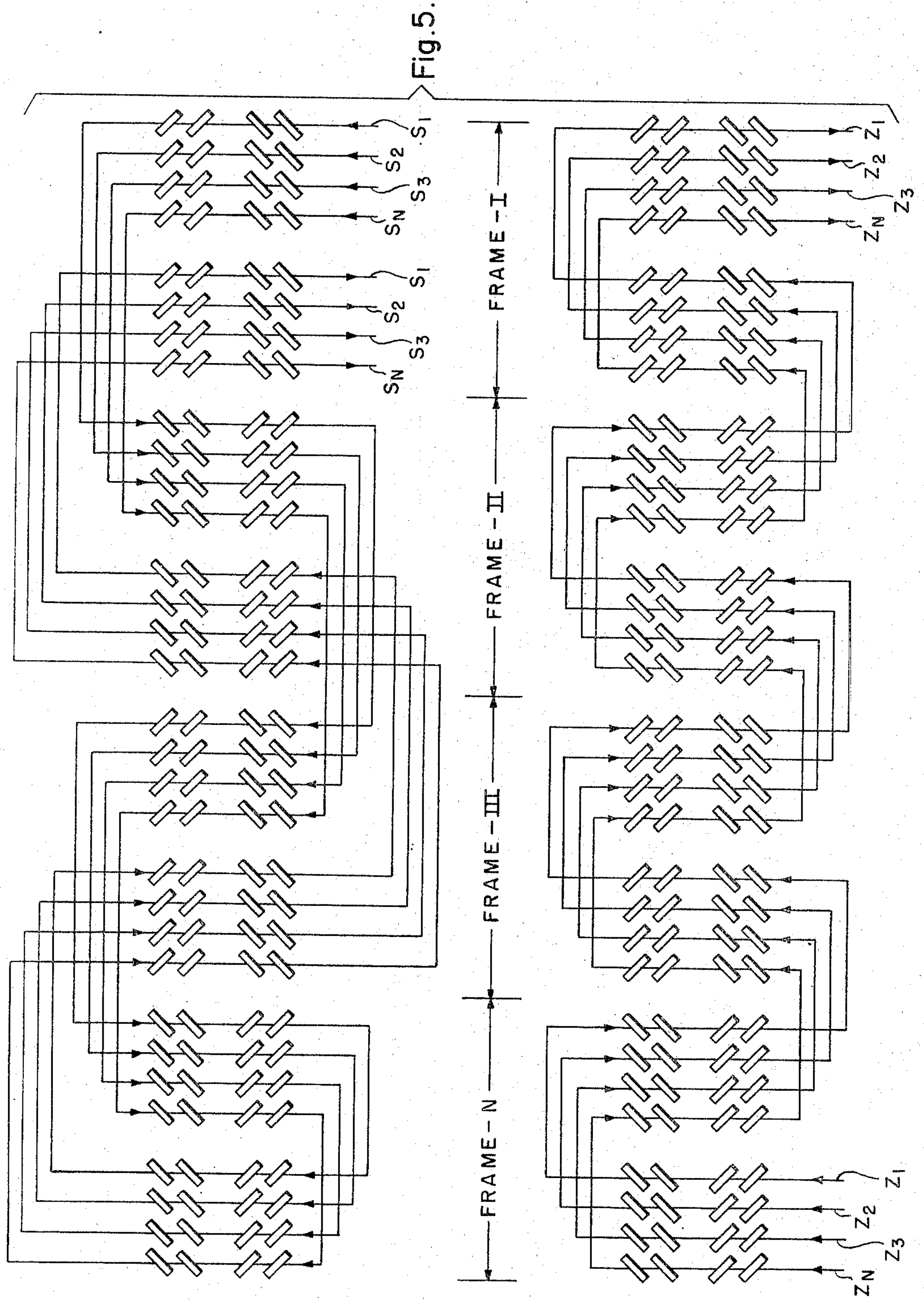

The unique feature which makes this possible is the novel arrangement of the core array and core windings as shown in FIGS. 4 and 5; a plurality of memory frames each having two parallel planes, Plane 1 and Plane 2, each divided into two groups, Group 1 and Group 2, of magnetic cores. The cores of each group form a plurality of words, each word having four bit storage elements or magnetic cores, two words shown in each group for purposes of simplicity. All the cores of Group 1 in any particular plane of any particular frame are oriented at substantially 90 mechanical degrees to those in Group 2 of the same plane of magnetic cores. At the same time, all the cores of Group 1 are similarly oriented to those in its neighbor group of the other plane in its associated frame. It is to be noted that the frames I, II, III . . . N are stacked to provide orientation of cores in neighbor groups within a given frame opposite to the orientation of cores in neighbor groups within the adjacent frame. Neighbor groups are those groups lying adjacent each other but in different planes as distinguished from Group 1 and Group 2 which are adjacent but in the same plane of the frame.

Considering the first half-select write winding X and the second half-select write winding Y, it can be seen that the orientation of the cores in one group to those in the other group of the same plane allow the half-select currents of the X and Y-windings to be additive in polarity through each core of any particular word.

More particularly, the Planes 1 and 2 of cores are paired in mechanical frames I, II, II . . . N. All the X and Y-windings are located on one side of the stack to facilitate interconnections to X and Y-windings of other frames. For purposes of clarity, only the input and output terminals to each frame have been shown. The X-windings then are threaded through each word of a group in one plane and its neighbor group in the other plane in the frame. The X-winding alternately extends through a word of the first group and a word of its neighbor group with arrows on the drawing showing that the extension in one direction through a word in one group is in the opposite direction to the extension through a word in its neighbor group.

At the same time, the second half-select write windings Y are threaded through a respective word in the first group and a respective word in the second group in the same plane. Such extension is alternately threaded through words in each group within the frame and poled in the opposite direction as again indicated by the arrows. The jumpers connecting each frame in the stack have been illustrated between the Y-winding and the Y'-winding of an adjacent frame; such jumpers being made externally to the stack of frames.

Thus, it can be seen that the leads of the X and Y-windings are located on one side of the stack to facilitate interconnections and to make half-select currents of the X and Y-windings additive in polarity through each bit storage element or core.

The disposition of the sense S and inhibit Z-windings is as illustrated in FIG. 5. The sense S and inhibit Z-windings are poled in the same direction through every other frame, frame II and frame N, and poled in the opposite direction through intermediate frames, frame I and frame III. The opposition of the sense and inhibit windings for each second pair of planes while being poled in the same direction for the other pairs cancels out the effect of the inhibit winding on the sense winding. The same result could have been obtained by alternating adjacent cores in orientation but in doing so the volume of each frame would have to be considerably increased.

FIG. 6 shows a chart for writing into any particular word in the memory array schematically illustrated in FIGS. 4 and 5. For example, for writing into word 1 the combination of half-select windings $X_1$ and $X_2$ are to be energized. For writing into word 32, the combination of half-select windings $X_7$ and $Y_3$ are to be energized.

Figure 7:
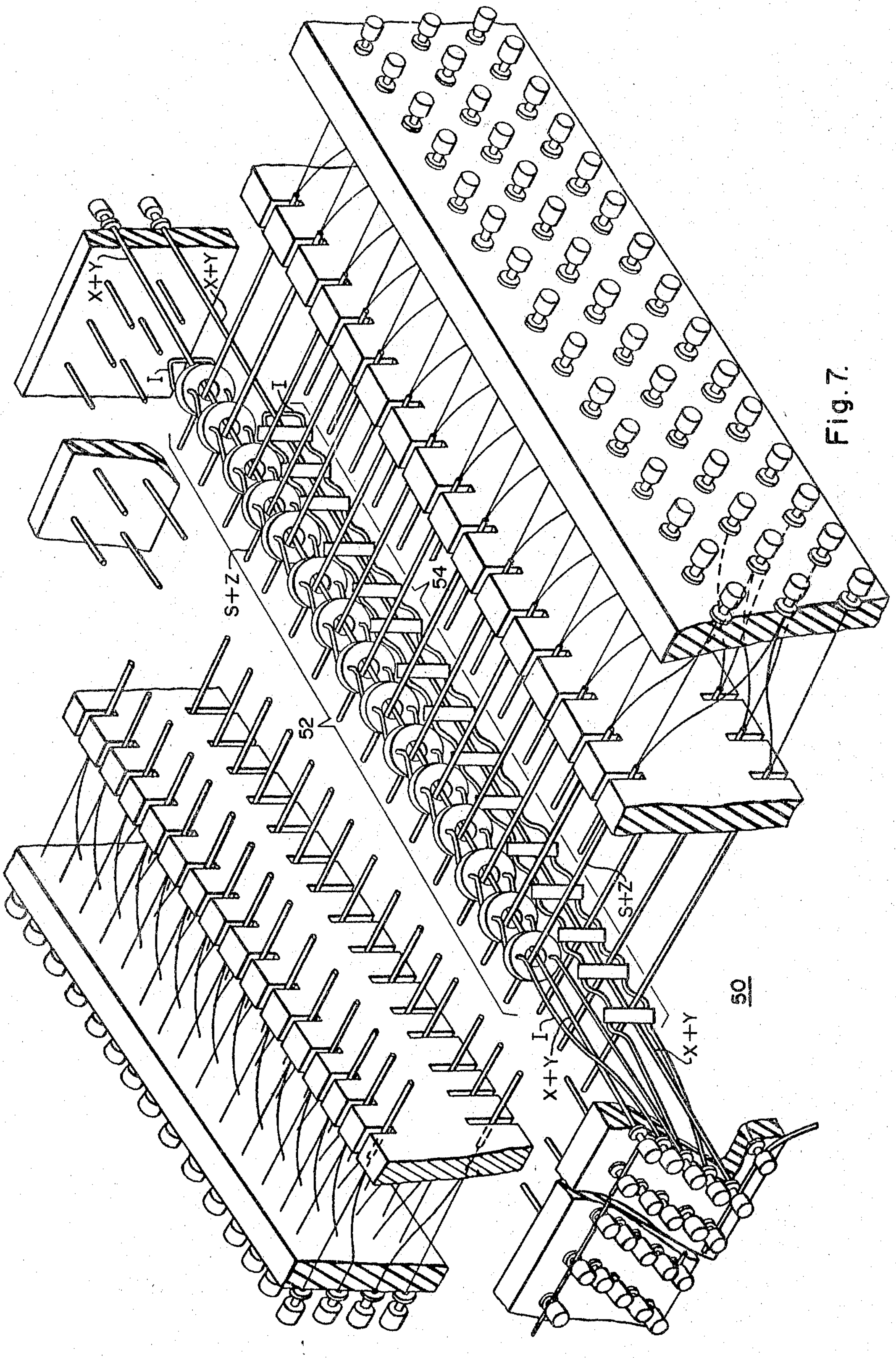
FIG. 7 is a fragmentary perspective view of the illustrative embodiment shown in FIGS. 3, 4 and 5.

For a clearer view of the disposition of windings and cores in the present core array, a perspective view, partly in section, of a frame 50 is shown in FIG. 7. Two words 52 and 54 in neighboring groups in the frame 50 have been more particularly illustrated.

Each word comprises a plurality of multi-aperture cores. The first half-select and second half-select write windings $(X+Y)$ extend through each word while the sense and inhibit windings $(S+Z)$ extends through a core of each word at substantially 90 mechanical degrees to each other. Interrogate windings I extend through minor apertures of each core of any particular word.

Once again, it is to be noted that within each frame the internal wiring is only two-dimensional. Where connections between the two planes of a particular frame are to be made, a set of common terminals is provided to thread the windings through the frame. Connections in the third or vertical direction of the stack are readily made by means of jumpers connected to terminals external of each frame 50.

Figure 8:
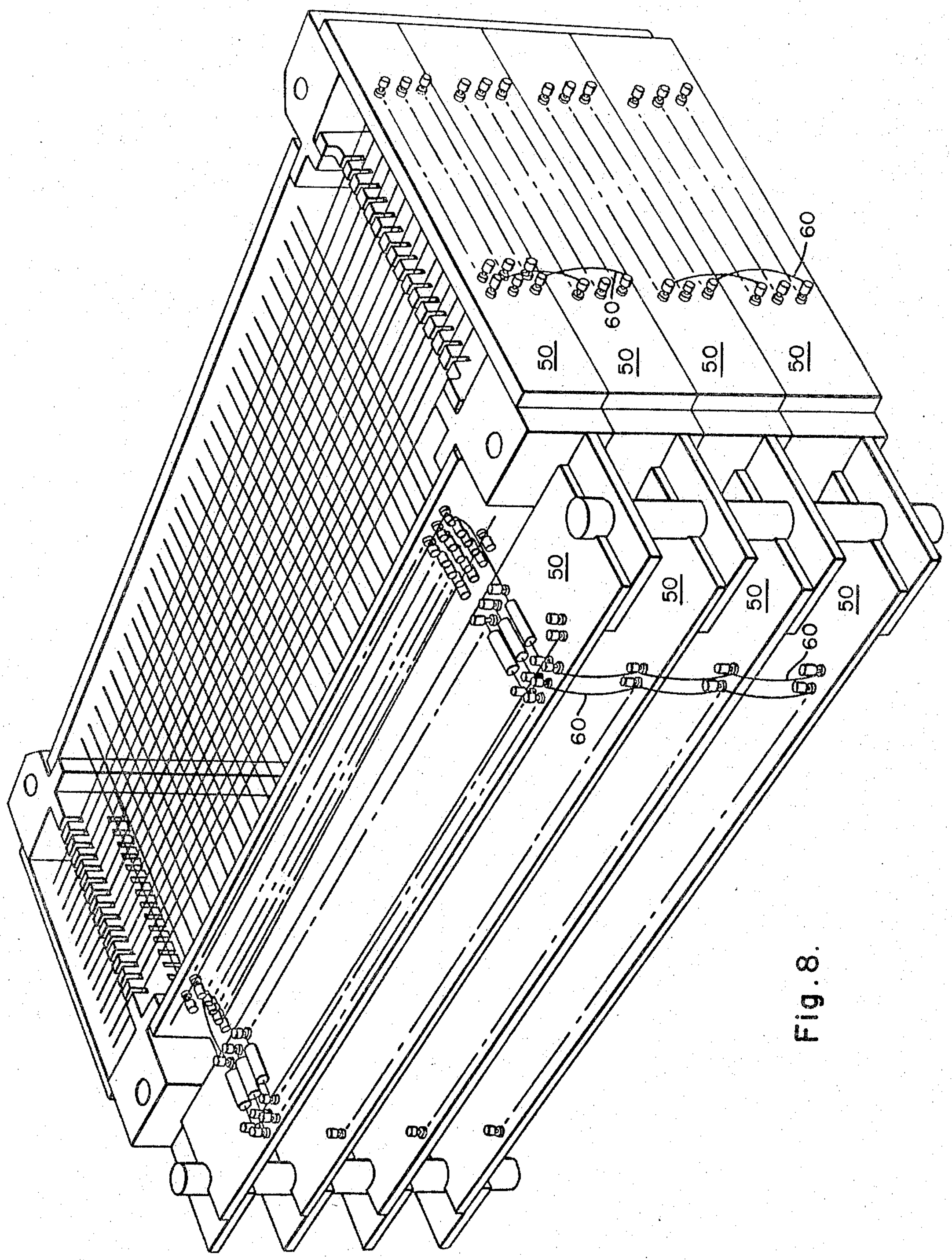
FIG. 8 is a fragmentary perspective view of an illustrative embodiment of the present invention including a number of frames as detailed in FIG. 7.

FIG. 8 illustrates a stack of such frames 50 with the jumper connections 60, externally made. The jumpers, of course, are connected in accordance with the core and wiring organization described in connection with the previous figures.

Accordingly, the present invention provides a multi-aperture core memory stack having no internal wiring between planes which not only allows each plane to be separately wired and later interconnected but at the same time allows the memory stack to be disassembled for necessary repairs. Each particular frame with its two component planes can be regarded as a fully functional stack in itself, a stack that can be fabricated, tested and used as a unit. Each plane can be separately tested with regard to the write windings and inhibit windings. The pair of planes in a frame can be further tested individually to check out the cancellation effect of the sense inhibit wiring scheme. For speed and ease of assembly, straight wiring runs have been provided. A simple logical wiring configuration has been provided for ease of wiring while allowing an increase in word-capacity at any time by adding additional frames to the stack. The minimum volume required to accomplish the present invention additionally provides improved electrical characteristics and improved mechanical packing density heretofore unavailable.

While the present invention has been described with a degree of particularity for the purpose of illustration, it is to be understood that all alterations, modifications and substitutions within the spirit and scope of the present invention are herein meant to be included.

We claim as our invention:

1. A memory frame comprising two parallel planes each divided into two groups of magnetic cores; the cores of each group forming a plurality of words; a first winding extending through each word of one group and its neighbor group of the other plane in the frame; a plurality of second windings each extending through a respective word in said one group and a respective word in the other group of its respective plane in the frame; and means for orientating the cores of said one group with the cores of said other groups to provide currents through each core which are additive in polarity.

2. The apparatus of claim 1 wherein said first winding alternately extends through a word of said first group and a word of its neighbor group.

3. The apparatus of claim 1 wherein said first winding alternately extends in one direction through a word in said one group and in the other direction through a word in its neighbor group.

4. The apparatus of claim 1 wherein said plurality of second windings each extends through a respective word in said one group and a respective word in said other group but in opposite directions.

5. A memory frame comprising two parallel planes each divided into two groups of magnetic cores; all the cores of one group being orientated at substantially 90 mechanical degrees to those in the other group in a plane but similarly orientated to those in its neighbor group of the other plane in the frame; the cores of each group forming a plurality of words; a first winding extending through each word of said one group and its neighbor group; a plurality of second windings each extending through a respective word in said one group and a respective word in said other group.

6. In a linear read-word organized and coincident write-bit organized memory array; a stack of frames; each frame having two parallel planes each divided into two groups of magnetic cores; all the cores of one group being orientated at substantially 90 mechanical degrees to those in the other group in a plane but similarly orientated to those in its neighbor group of the other plane in the frame; the cores of each group forming a plurality of words; first half select write winding means extending through each word of said one group and its neighbor group; second half select write winding means extending through a respecitve word in said one group and a respective word in said other group; sense winding means extending through a respective core of each word in one plane; and inhibit winding means extending through a respective core of each word in each plane of said frame.

7. In a linear read-word organized and coincident write-bit organized memory array; a stack of frames; each frame having two parallel planes each divided into two groups of magnetic cores; all the cores of one group being orientated at substantially 90 mechanical degrees to those in the other group in a plane but similarly orientated to those in its neighbor group of the other plane in the frame; the cores of each group forming a plurality of words; first half select write winding means extending through each word of said one group and its neighbor group; second half select write winding means extending through a respective word in said one group and a respective word in said other group; sense winding means extending through a respective core of each word in one plane; inhibit winding means extending in the same direction through respective cores of each word of each group in a plane and in the opposite direction through respective cores of each word of each group in the other plane of said frame; and sense winding means disposed in the same manner as said inhibit winding means but poled in the opposite direction only in every other frame.

8. In a linear read-word organized and coincident write-bit organized memory array; a stack of frames; each frame having two parallel planes each divided into two groups of magnetic cores; all the cores of one group being orientated at substantially 90 mechanical degrees to those in the other group in a plane but similarly orientated to those in its neighbor group of the other plane in the frame; the cores of each group forming a plurality of words; a plurality of first half-select write windings each extending through each word of a respective said one group and its neighbor group; a plurality of second half-select write windings each extending through a respective word in said one group and a respective word in said other group; a plurality of sense windings each extending through a respective core of each word in a plane; and a plurality of inhibit windings each extending through a respective core of each word in each plane of said frame; said plurality of inhibit windings each extending through the cores of one plane in the frame in opposing directions to that through the other plane and said plurality of sense windings each extending through a respective core in each word in each plane of said frame in opposing directions whereby cross effect is greatly reduced.

9. In a linear read-word organized and coincident write-bit organized memory array; a stack of frames; each frame having two parallel planes each divided into two groups of magnetic cores; all the cores of one group being orientated at substantially 90 mechanical degrees to those in the other group in a plane but similarly orientated to those in its neighbor group of the other plane in the frame; the cores of each group forming a plurality of words; a plurality of first half-select write windings each extending through each word of a respective said one group and its neighbor group; a plurality of second half-select write windings each extending through a respective word in said one group and a respective word in said other group; each said winding being brought in and out of each frame on the same side whereby interconnections can be made to the adjacent frames.

10. In a linear read-word organized and coincident write-bit organized memory array; a stack of frames; each comprising two parallel planes each divided into two groups of magnetic cores; all the cores of one group being orientated at substantially 90 mechanical degrees to those in the other group in a plane but similarly orientated to those in its neighbor group of the other plane in the frame; the cores of each group forming a plurality of words; said frames stacked to provide orientation of cores in neighbor groups within a given frame opposite to the orientation of cores in neighbor groups within the adjacent frame.

11. In a linear read-word organized and coincident write-bit organized memory array, a plurality of frames each comprising two parallel planes each divided into two groups of magnetic cores; all the cores of one group being orientated at substantially 90 mechanical degrees to those in the other group in a plane but similarly orientated to those in its neighbor group of the other plane in the frame; the cores of each group forming a plurality of words; a plurality of first half-select write windings each extending through each word of a respective said one group and its neighbor group; a plurality of second half-select write windings each extending through a respective word in said one group and a respective word in said other group; a plurality of sense windings each extending through a respective core of each word in a plane; a plurality of inhibit windings each extending through a respective core of each word in each plane of said frame; said frames stacked to provide orientation of cores in neighbor groups within a given frame opposite to the orientation of cores in neighbor groups within the adjacent frame; each said plurality of windings being brought in and out of each frame on a selected side of the frame; and means for connecting said plurality of sense and inhibit windings in the same direction through every other frame and in the opposite direction through intermediate frames.

12. The magnetic memory frame having four groups of words disposed in two parallel planes, two groups in each plane; the cores in each group oppositely orientated in the other group in its plane and similarly orientated to the like located group of the other plane in said frame; the cores of each group forming a plurality of complete words; a first half select write winding extending through a word in each group of each plane and a second half select write winding extending through each word of like located groups of each frame; the first and second half select write windings extending in the same direction through any given word.

13. In a linear read-word organized and coincident write-bit organized memory array; a stack of frames; each frame having two parallel planes, each divided into two groups of multi-aperture magnetic cores; the cores of each group forming a plurality of words; first half-select write winding means extending through a word in each group of each plane; second half-select write winding means extending through each word of neighbor groups of each frame; inhibit winding means extending through a respective core of each word in each plane of said frame; sense winding means extending to a respective core of each word in a plane; and interrogate winding means extending through each word through the minor apertures of each core therein.

References Cited by the Examiner

UNITED STATES PATENTS

| | | | |
|---|---|---|---|
| 3,161,860 | 12/1964 | Grooteboer | 340—174 |
| 3,214,745 | 10/1965 | Eiseman et al. | 340—174 |
| 3,245,059 | 4/1966 | Eiseman et al. | 340—174 |

BERNARD KONICK, *Primary Examiner.*

S. M. URYNOWICZ, *Assistant Examiner.*